United States Patent [19]

Spinka

[11] Patent Number: 5,108,018
[45] Date of Patent: Apr. 28, 1992

[54] DETACHABLE CARRIERS FOR MOTOR VEHICLES

[76] Inventor: James Spinka, 1306 Camino-Lucientes, Green Valley, Ariz. 85614

[21] Appl. No.: 651,745

[22] Filed: Feb. 7, 1991

[51] Int. Cl.$^5$ .............................................. B60R 9/10
[52] U.S. Cl. ................... 224/42.03 R; 224/42.03 B; 224/42.08; 414/462
[58] Field of Search ................ 224/42.03 R, 42.03 B, 224/42.28, 42.44, 42.21, 282, 42.08; 211/17, 18, 22, 96, 168; 248/573, 574; 414/462, 463, 466

[56] References Cited

U.S. PATENT DOCUMENTS

| | | | |
|---|---|---|---|
| 653,681 | 7/1900 | Lee | 211/17 X |
| 1,390,865 | 9/1921 | Bangle | 248/573 |
| 2,802,612 | 3/1956 | Barcafer | 224/42.03 R |
| 3,187,914 | 6/1965 | Peras | 224/42.21 X |
| 4,050,616 | 9/1977 | Mosow | 211/17 X |
| 4,089,448 | 5/1978 | Traeger | 224/42.03 B |
| 4,140,255 | 2/1979 | Weiler | 224/42.21 X |
| 4,400,129 | 8/1983 | Eisenberg et al. | 224/42.03 B |
| 4,411,461 | 10/1983 | Rosenberg | 211/17 X |
| 4,461,413 | 7/1984 | Hoerner | 224/311 |
| 4,483,468 | 11/1984 | Lucas | 224/42.08 X |
| 4,676,414 | 6/1987 | Degueuara | 224/42.03 B X |
| 4,695,218 | 9/1987 | Boyer | 224/42.03 X |
| 4,811,874 | 3/1989 | Robison | 224/42.21 |

FOREIGN PATENT DOCUMENTS

| | | | |
|---|---|---|---|
| 48009 | 9/1980 | Canada | 224/42.21 |
| 17996 | of 1901 | United Kingdom | 211/18 |

Primary Examiner—Ernest G. Cusick
Assistant Examiner—Glenn T. Barrett
Attorney, Agent, or Firm—Mathews, Woodbridge & Collins

[57] ABSTRACT

A detachable carrier for use on motor vehicles such as cars, trucks, and the like. A lower hollow post is pivotably connected to an upper hollow post that carries a cross piece on which a pair of hangers are mounted. An anchor bolt is fixed on the lower post for mounting the carrier on a conventional trailer hitch mounting bracket. A locking pin cooperates with superimposed locking holes to lock the carrier in the upright position. A counterbalancing spring and a stop-limit chain are mounted inside the hollow posts. The spring is a coil spring in one embodiment and a leaf spring in another embodiment. An assembly is provided for adjusting the counterbalancing spring force applied to the posts.

20 Claims, 8 Drawing Sheets

DETACHABLE CARRIERS FOR MOTOR VEHICLES

BACKGROUND OF THE INVENTION

1. Field of the Invention

The present invention relates to detachable carriers for vehicles. More specifically, it relates to a carrier which has a breakaway mechanism.

2. Description of the Prior Art

The use of breakaway article carriers for mounting bicycles, motorcycles, wheelchairs, and similar articles on the rear of a motor vehicle is known. Prior mechanisms have not, however, been suitable in practice. Typically, such devices include an articulating mechanism whereby a portion of the carrier is rotated down and away from the vehicle to permit easy access to the vehicle parts (e.g. automobile trunk or gas tank) or to facilitate the mounting of heavy objects (e.g. wheelchairs) onto the carrier. Such mechanisms are unsuitable because they are too complex to mount and operate, rendering them expensive to manufacture and unsafe to use in many situations. Examples of prior art carriers may be found in the following U.S. Pat. Nos.: 4,400,129; 2,802,612; 4,461,413; 4,695,218; 4,089,448.

Particular attention is directed to the '129 patent which discloses a wheelchair carrier and loading device capable of being removably installed on a vehicle and wherein the carrier includes a mounting support that is rotatable between an article-carrying position and an article-receiving position. Springs are provided to prevent excessive rotation and to exert a controlled bias on the mounting support. While the carrier of the '129 patent does have a breakaway feature, the carrier has a number of complex moving parts that are exposed to the user, making it unsafe to use in many situations. Additionally, the exposed moving parts are vulnerable to damage and theft.

SUMMARY OF THE INVENTION

To alleviate these problems of the prior art, the present invention includes a breakaway carrier having counterbalancing and rotation-limiting mechanisms that are concealed, yet they are easily accessible for installation and adjustment. Once adjusted to accommodate the size and weight of the articles to be carried, the counterbalancing and rotation-limiting mechanisms are safely housed in the supporting structures. As such, the carrier of the present invention is simple, easy to use and completely safe, when properly used.

The exact nature of this invention, as well as other objects and advantages thereof, will be readily apparent from consideration of the following specification relating to the annexed drawings.

DETAILED DESCRIPTION OF THE PREFERRED EMBODIMENTS

Figure 1:
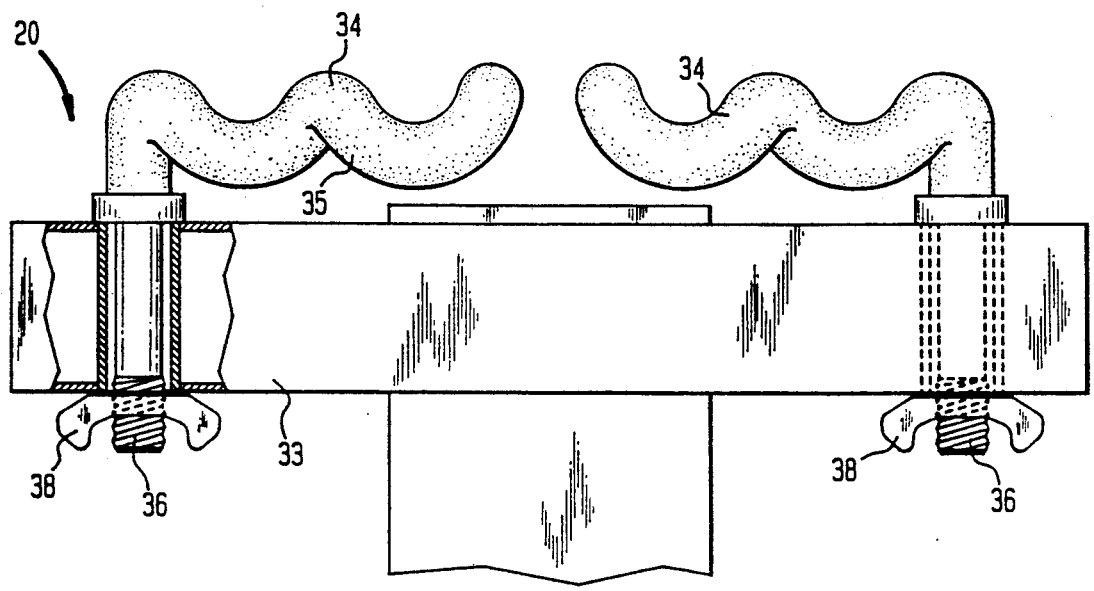
FIG. 1 is a front elevation with parts broken away of the preferred embodiment of the invention.
Figure 1:
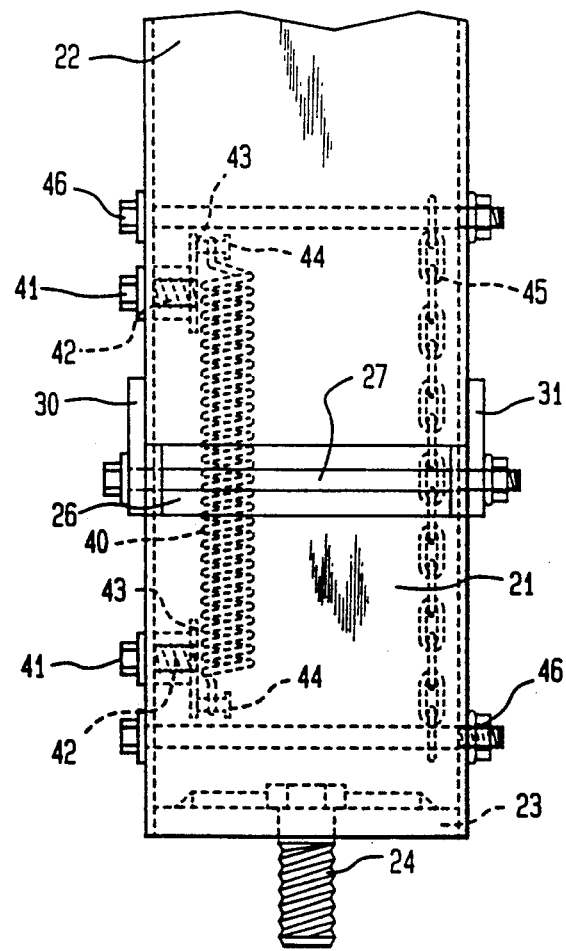
Figure 2A:
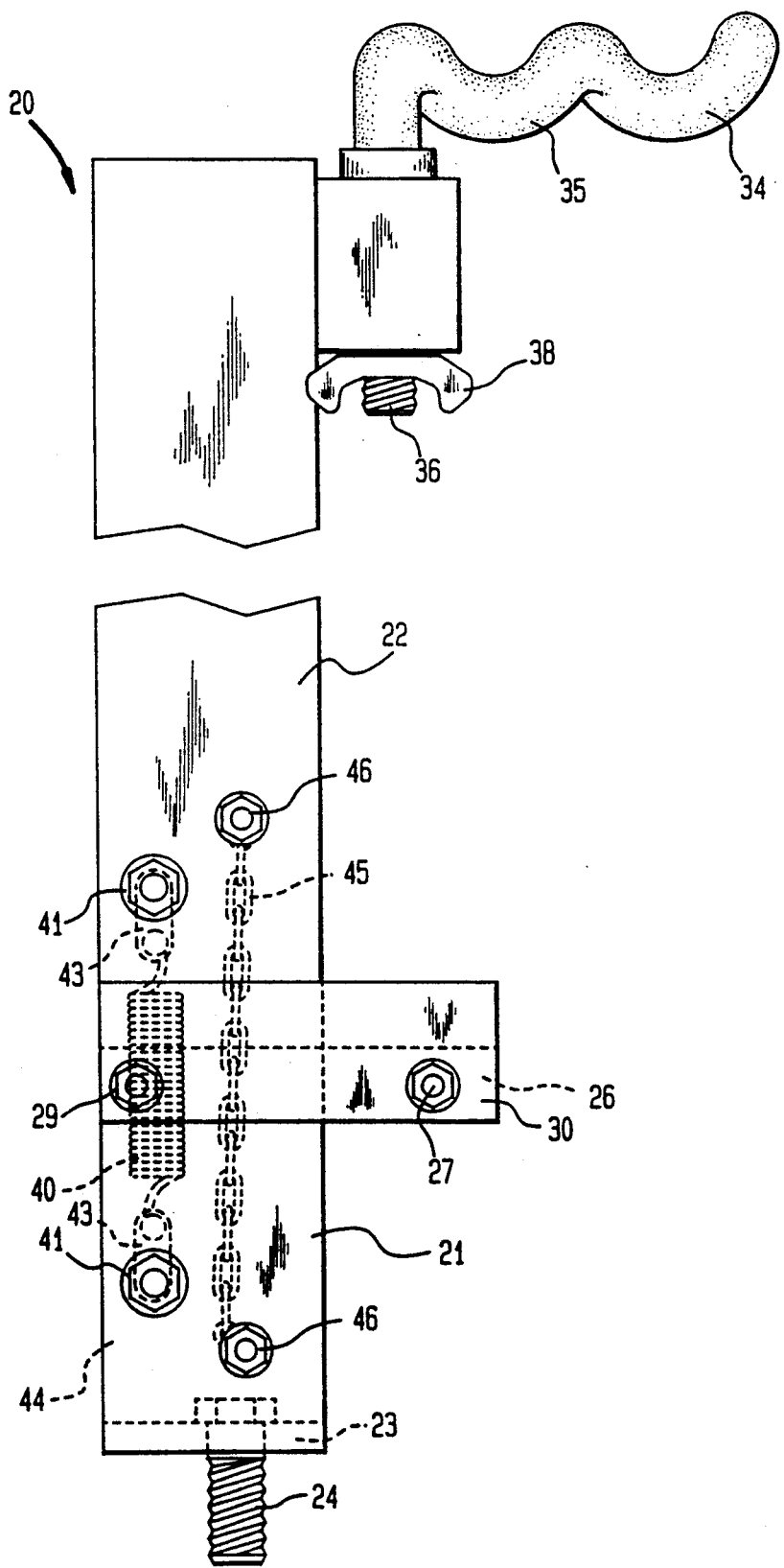
FIGS. 2A and 2B are side elevations illustrating two counterbalancing positions of the device shown in FIG. 1.
Figure 2B:
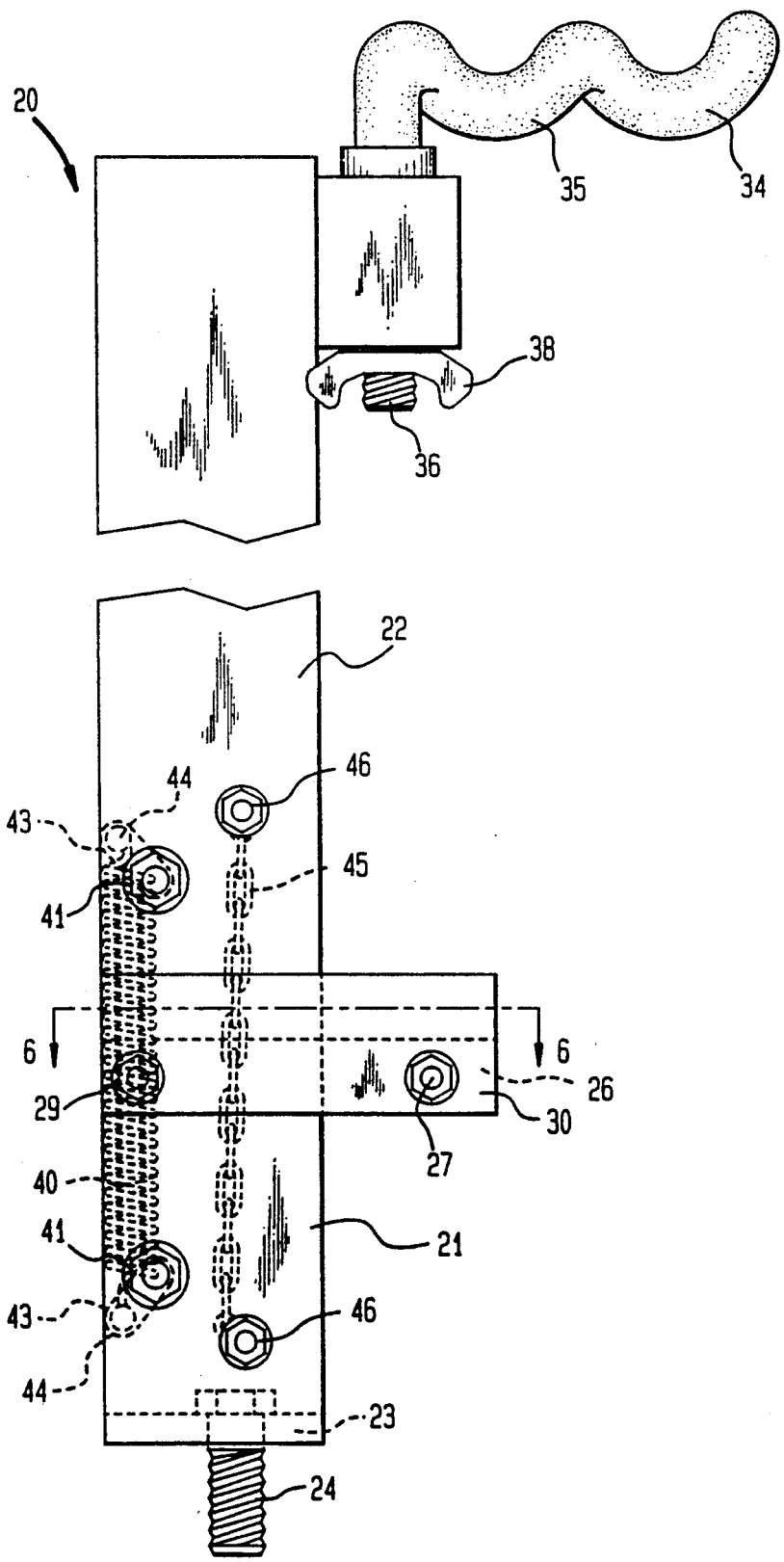
Figure 3:
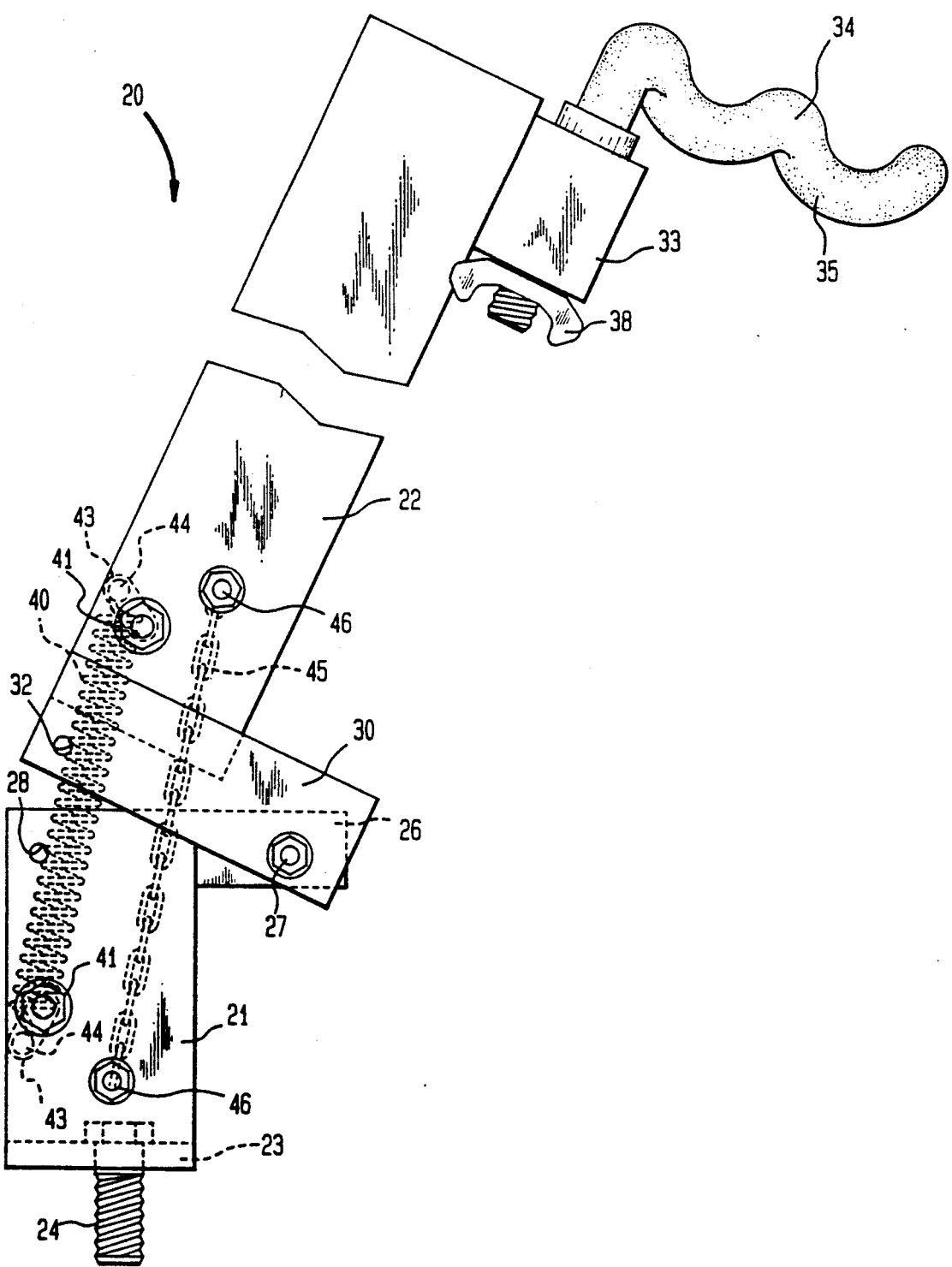
FIG. 3 is a side elevation showing the device of FIG. 1 in the article-receiving position.
Figure 8:
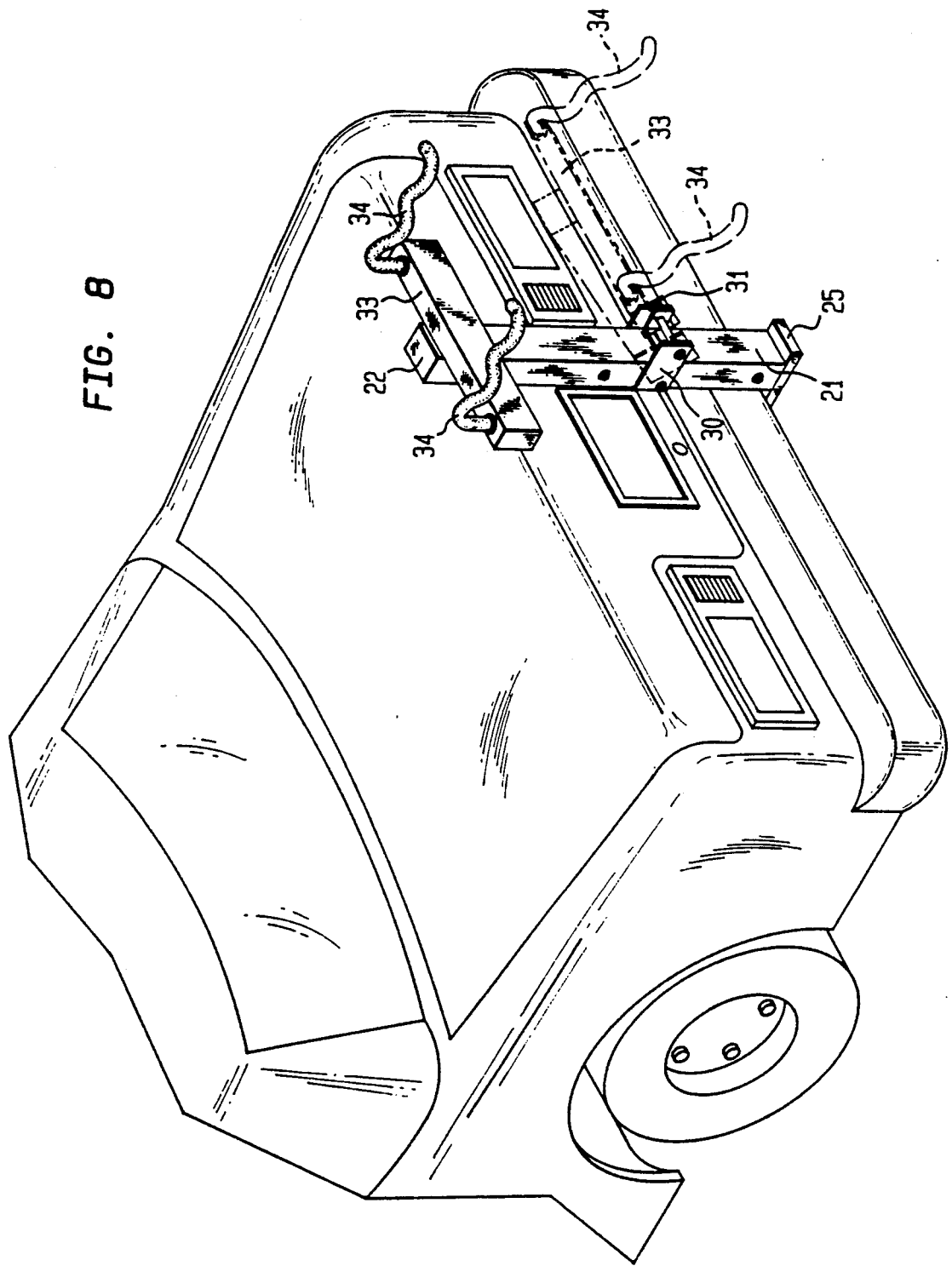
FIG. 8 is a pictoral view showing the preferred embodiment mounted on the rear of an automobile.

Referring now to the drawings, there is shown in FIGS. 1-3 a carrier 20 having a hollow bottom post 21 and a hollow top post 22. Bottom post 21 has an end plate 23 to which an anchor bolt 24 is fixed. Bolt 24 is dimensioned to fit on and be secured to a typical trailer hitch mounting bracket 25 (FIG. 8) in the conventional manner. Secured to the front face of bottom post 21 at its upper end is a U-shaped bracket 26 having a pair of openings for receiving a hinge pin 27. An opening 28 (FIG. 3) is located in the side surface of post 21 to receive a locking pin 29.

The upper post 22 has a pair of hinge plates 30, 31 that are secured to the lower sides thereof. Hinge plate 30 has an opening 32 that is superimposed on opening 28 when the carrier 20 is in the locked, upright position (FIG. 2). Openings 28, 32 receive the locking pin 29.

A cross piece 33 is secured to the upper end of top post 22. At either side of the cross piece 33 there are mounted adjustable hangers 34. Each hanger 34 has an arm 35 that has indentations for receiving the item to be carried. To prevent damage to the item, the arms 35 are coated with a soft material such as rubber or plastic.

The hangers 34 also include a threaded bolt 36 that passes through the bushing 37 mounted in openings on the cross piece 33. The hangers 34 are secured in the cross piece 33 by wing nuts 38 that are threaded onto the bolts 36.

The carrier 20 includes a counterbalancing means in the form of a coil spring 40 that is mounted inside the hollow posts 21, 22. The spring 40 is attached at either end to identical spring tensioners 41. Each tensioner 41 includes a rotatable bolt 42 having a strap 43 secured thereto. Eccentric pins 44 are fixed to the ends of straps 43 to secure the ends of the spring 40. In FIG. 2A the tensioners 41 are shown in the spring-installation position. In this position (FIG. 2A), the ends of spring 40 are hooked onto the respective pins 44 while spring 40 is subjected to little or no tension. To facilitate the initial installation of spring 40, the interior of posts 20, 21 are made accessible by rotating the posts 20, 21 into the FIG. 3 position. After installation, the spring 40 may be adjusted into one of three different degrees of counterbalancing tension. Minimum counterbalancing tension is achieved with the tensioners 41 in the FIG. 2A position. Maximum counterbalancing tension is achieved by rotating tensioners 41 into the FIG. 2B position where the ends of straps 43 abut the interior surface of posts 20, 21. An intermediate counterbalancing tension is achieved by rotating only one of the straps 43 into the FIG. 2B position while leaving the other strap 43 in the FIG. 2A position.

Also located in the hollow posts 21, 22 is a limit-stop chain 45. A pair of bolts 46 secure either end of chain 45 to the posts 21, 22. The length of the chain 45, which may be readily adjusted, will determine the maximum angle that the post 22 can be rotated with respect to the post 21 when the carrier 20 is placed in the article-receiving position (FIG. 3).

Operation of the carrier 20 is as follows: After manually setting the position of the hangers 34 via the wing nuts 38 to the position desired, the user will first remove the locking pin 29 from the openings 28, 32. The user then rotates the upper post 22 downwardly about the hinge pin 27 to the article-receiving or loading position (FIG. 3). The chain 45 will limit the amount of rotation. The rotation will cause the spring 40 to elongate and be subjected to further tension. While holding the post 22 in the loading position, the user places the items, e.g. one or more bicycles, onto the hangers 34. The user at this point will then rotate the post 22 upwardly to the article-carrying position (FIG. 2B). Next, the locking pin 29 is replaced into the openings 28, 32 to secure and lock the carrier 20 in the upright, article-carrying position (FIG. 2B). When the user wishes to remove the items or wishes to obtain access to the car trunk, etc., he first removes the locking pin 29 and then rotates the post 22 downwardly. The spring 40 will counterbalance the weight of the items during this process. Next, the items are removed or the trunk is opened. The post 22 is then rotated back into the upright position and locked via pin 29.

Figure 4:
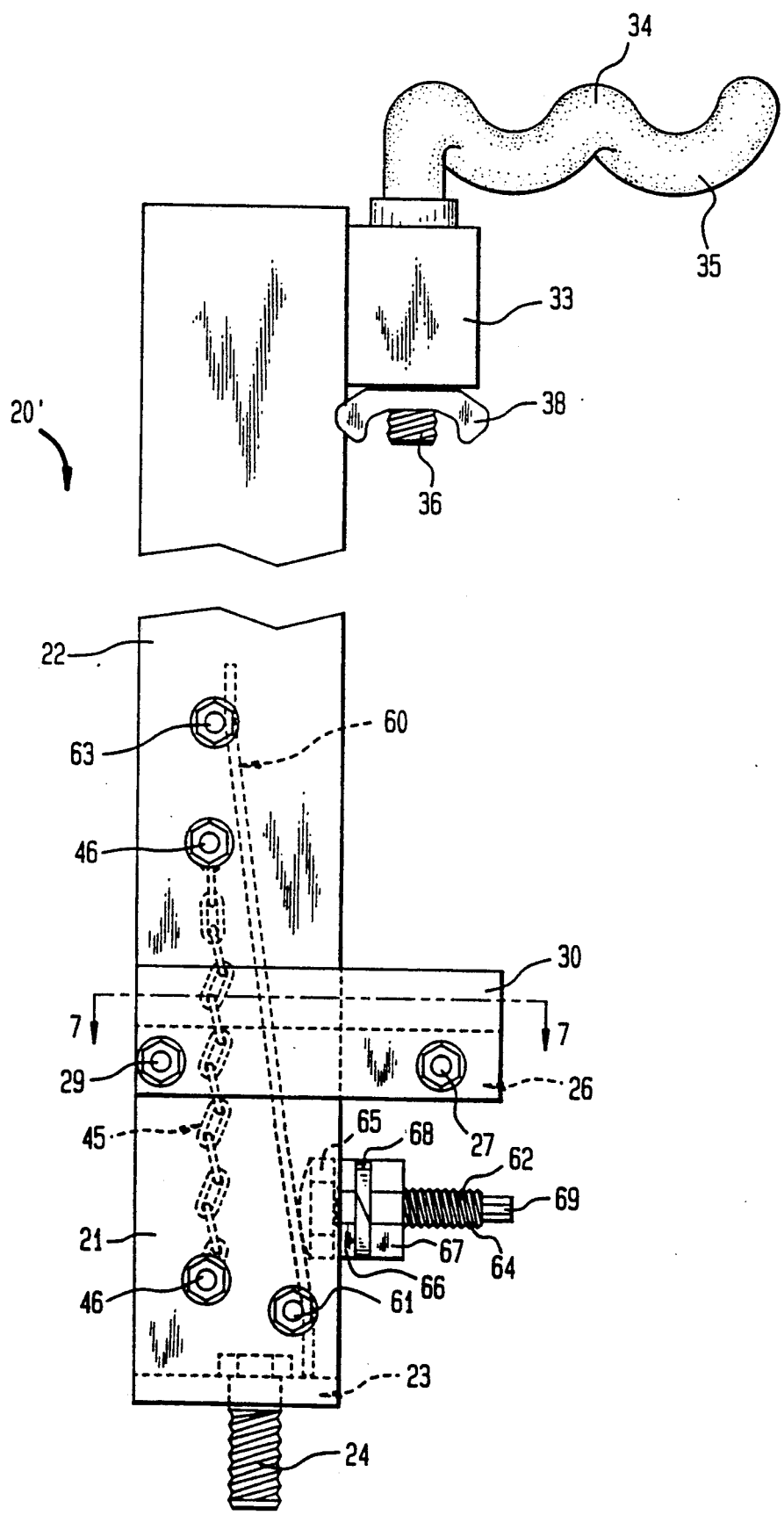
FIG. 4 is a side elevation of an alternate embodiment of the invention.
Figure 5:
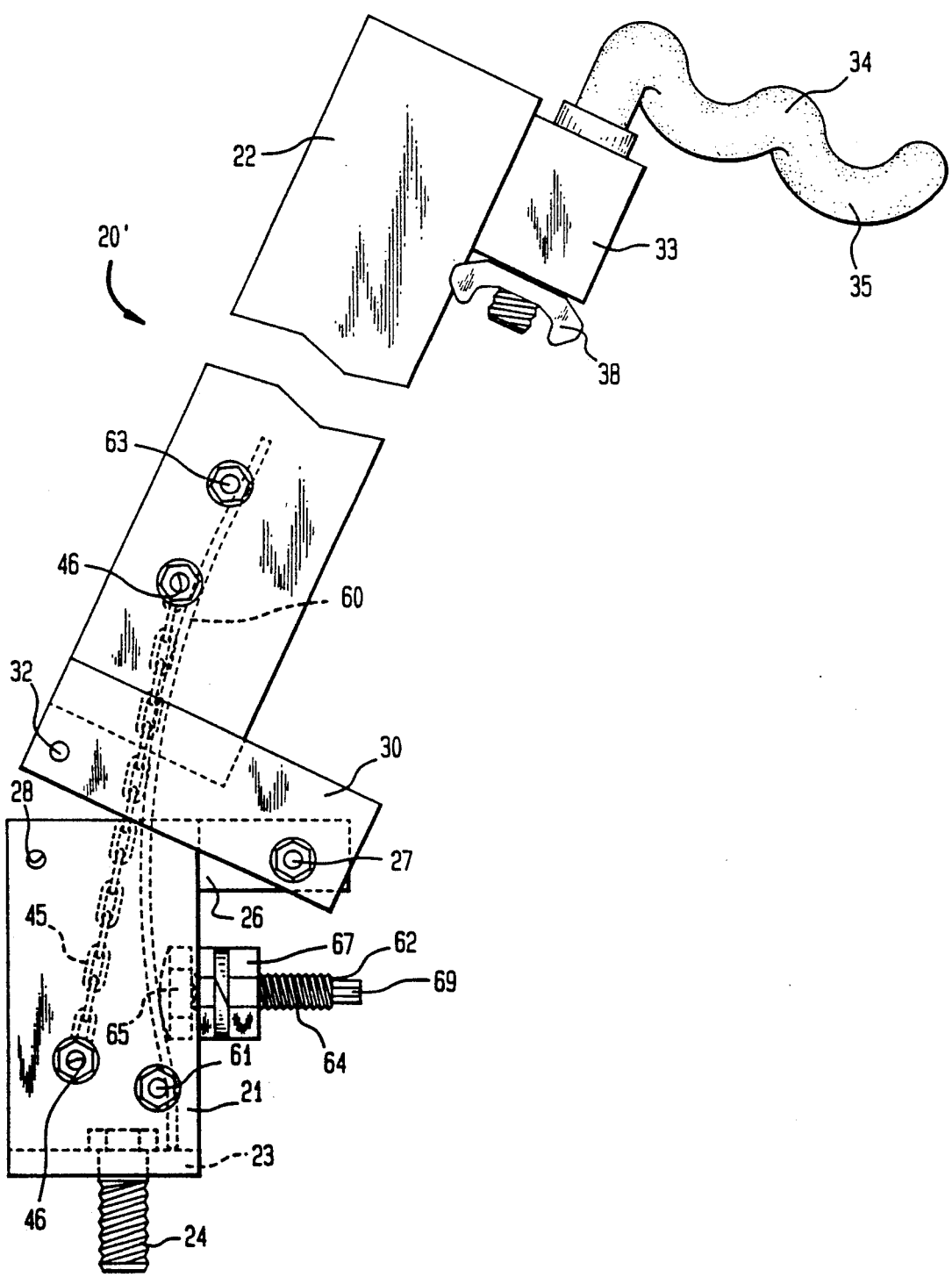
FIG. 5 is a side elevation showing the device of FIG. 4 in the article-receiving position.
Figure 6:
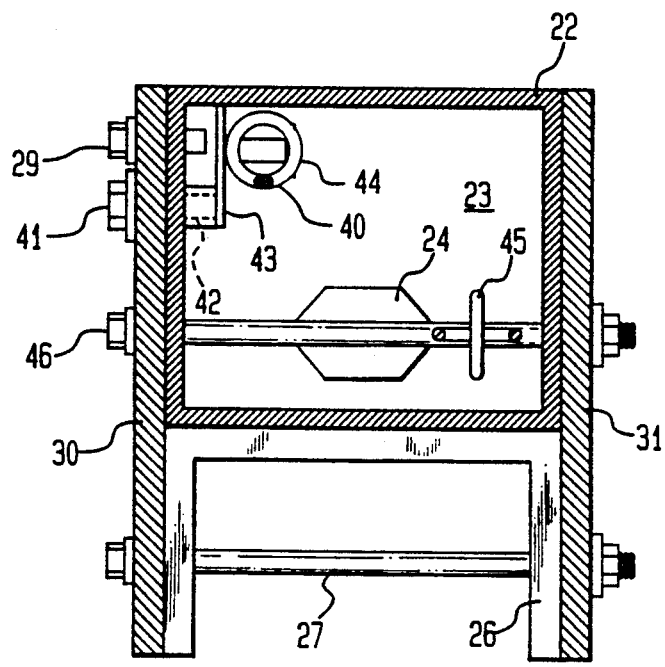
FIG. 6 is a cross section taken on the line 6—6 of FIG. 2 looking in the direction of the arrows.
Figure 7:
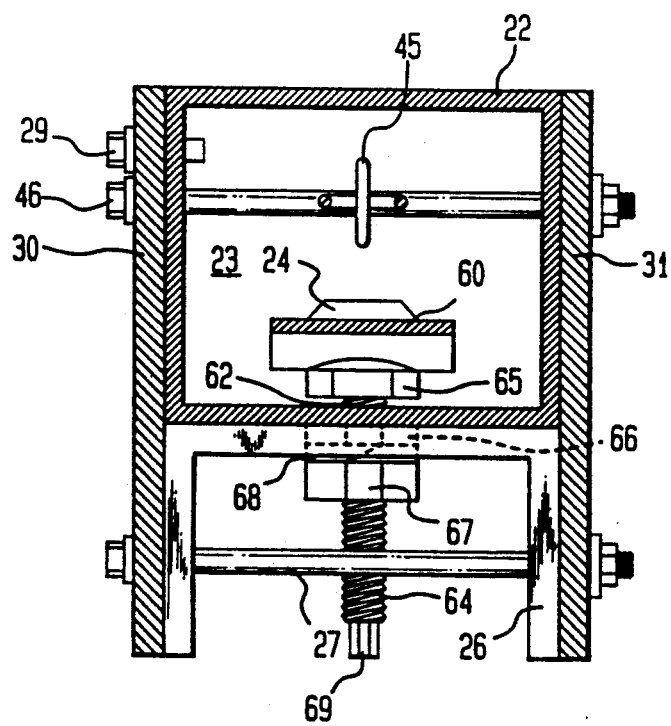
FIG. 7 is a cross section taken on the line 7—7 in a cross section taken on the line 7—7 of FIG. 4 looking in the direction of the arrows.

FIGS. 4, 5 and 7 illustrate a modified carrier 20'. In this embodiment, the carrier 20' has a leaf spring 60 that is housed in the interior of hollow posts 21, 22. The leaf spring 60 extends between bolts 61, 63. The spring 60 may be fixed to bolt 61 by a weld. The bolt 63 is fixed and permits sliding contact with the surface of spring 60. An adjustable tensioner 62, mounted on the post 21, has a threaded bolt 64 having a head 65 that abuts the spring 60 intermediate its ends. The bolt 64 is threaded into a nut 66 that is fixed to the outer surface of post 21. A lock nut 67, threaded onto bolt 64, and a lock washer 68 are provided to lock the bolt 64 in a desired position. The position of bolt 64 is adjusted by turning the bolt 64 with a wrench via a squared end 69. The amount of counterbalancing tension in spring 60 is adjustable by adjusting the position of bolt 64.

Various other modifications are contemplated and may obviously be resorted to by those skilled in the art without departing from the spirit and scope of the invention, as hereinafter defined by the appended claims, as only preferred embodiments thereof have been disclosed.

What is claimed is:

1. A carrier for use on motor vehicles comprising:
   a first hollow post;
   a second hollow post pivotably mounted on said first post;
   hanger means mounted on said second post for removably mounting articles thereon;
   locking means for releasably locking said posts in a first positon and for permitting relative rotation of said posts out of said first position when said locking means is released;
   spring means mounted in said posts for applying a counterbalancing torque to said posts for biasing said posts toward said first position in response to rotation of said posts out of said first position; and
   a stop-limit means secured to said posts for restricting rotation of said posts beyond a predetermined angle.

2. The carrier of claim 1 further including spring adjusting means for manual adjustment of the amount of said counterbalancing torque.

3. The carrier of claim 2 wherein said spring means includes a coil spring having first and second ends secured to said first and second posts respectively.

4. The carrier of claim 3 wherein said spring adjusting means includes means for varying the tension in said coil spring while in said first position.

5. The carrier of claim 4 wherein said stop-limit means includes a flexible line having first and second ends attached to said first and second posts respectively.

6. The carrier of claim 5 wherein said line is a chain.

7. The carrier of claim 6 wherein said locking includes locking holes in said posts that are superimposed when said carrier is in said first position and a locking pin capable of insertion in said holes when superimposed.

8. The carrier of claim 7 further including a mounting means for removably mounting said carrier on a motor vehicle.

9. The carrier of claim 8 wherein said mounting means includes a bolt extending from said first post.

10. The carrier of claim 2 wherein said spring means includes an elongated leaf spring mounted in said hollow posts, said spring having first and second ends secured to said first and second posts respectively.

11. The carrier of claim 10 wherein said leaf spring has at least one of said ends slidably secured.

12. The carrier of claim 11 wherein said spring adjusting means includes means for adjustably deflecting a portion of said spring intermediate said first and second ends.

13. The carrier of claim 12 wherein said stop-limit means includes a flexible line having first and second ends attached to said first and second posts respectively.

14. The carrier of claim 13 wherein said line is a chain.

15. A carrier for use on motor vehicles comprising:
   first and second hollow posts each having a central axis, and first and second ends;
   a hinge means secured to said first ends of said posts for pivotably connecting said posts together to enable rotation of said posts between a first position wherein said central axes are aligned and a second position wherein said central axes form a predetermined angle with each other;
   an article hanger mounted on said second end of said second post;
   a mounting means located on said second end of said first post for mounting said carrier on a motor vehicle;
   a counterbalancing spring mounted inside said posts having first and second ends secured to said first and second posts respectively; and
   a stop-limit means located inside said posts for restricting rotation of said posts beyond said predetermined angle.

16. The carrier of claim 15 further including locking means for selectively locking said posts in said first position.

17. The carrier of claim 16 further including spring force adjusting means for manual adjustment of the counterbalancing force of said spring.

18. The carrier of claim 17 wherein said spring is a coil spring.

19. The carrier of claim 17 wherein said spring is a leaf spring.

20. The carrier of claim 17 wherein said stop-limit means includes a chain having first and second ends secured to said first and second posts respectively.

* * * * *